Dec. 27, 1927.

K. E. PEILER 1,654,091

APPARATUS FOR HANDLING GLASSWARE

Filed March 3, 1923

Witness:
S. S. Grotta

Inventor:
Karl E. Peiler
by W. H. Honiss
Atty.

Dec. 27, 1927.
K. E. PEILER
1,654,091
APPARATUS FOR HANDLING GLASSWARE
Filed March 3, 1923   4 Sheets-Sheet 3
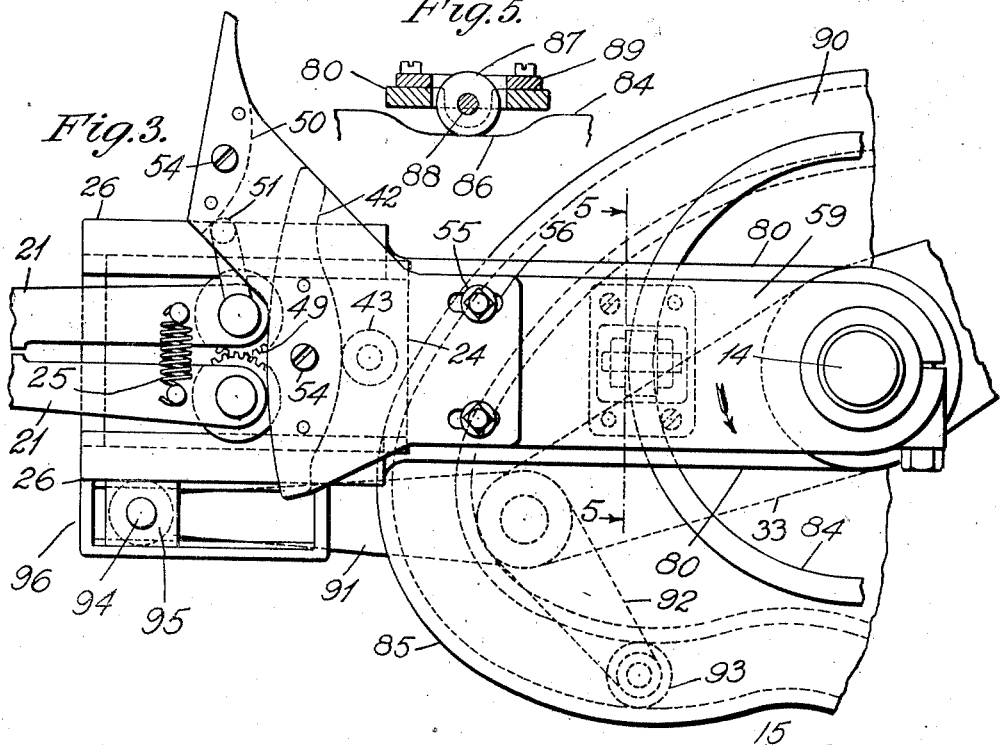
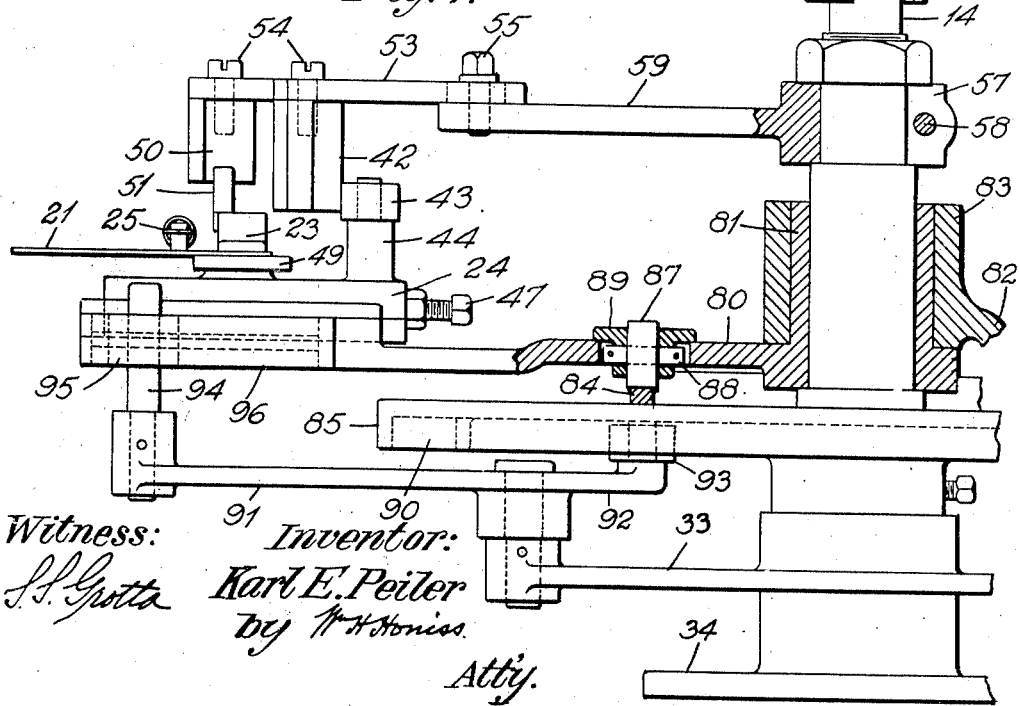
Witness:
S. S. Grotta
Inventor:
Karl E. Peiler
by W. H. Honiss
Atty.

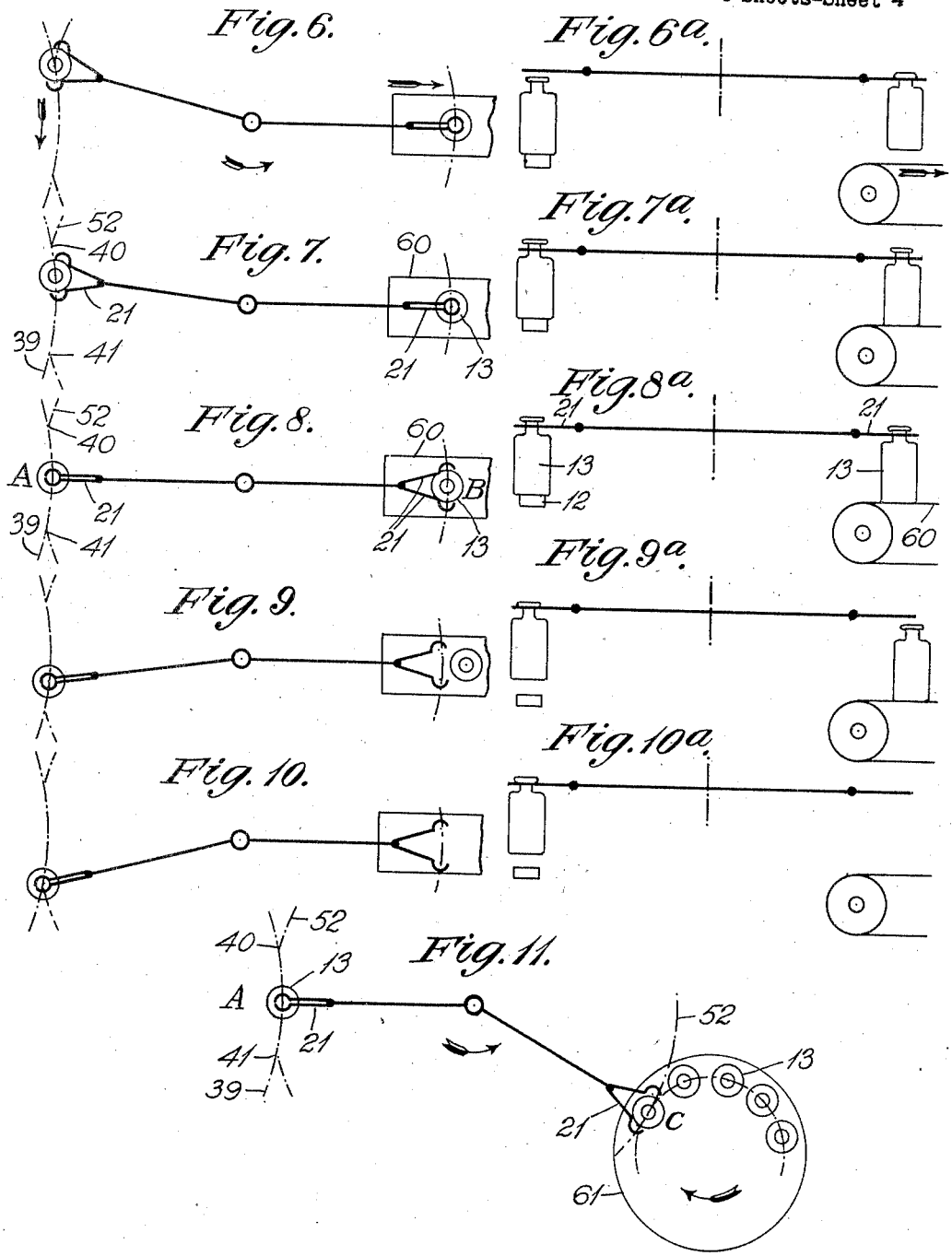

Patented Dec. 27, 1927.

1,654,091

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

APPARATUS FOR HANDLING GLASSWARE.

Application filed March 3, 1923. Serial No. 622,622.

The present invention relates to glassware handling apparatus, its general object being to provide an improved take-out adapted for taking the ware from the molds of a shaping machine, or from other ware carriers while the molds or carriers are moving, thus avoiding the necessity of stopping the molds or carriers while the ware is being taken out, as is the present usual practice. This enables the invention to be applied to machines having continuously moving molds or carriers. When applied to machines having intermittently moving molds or carriers, the taking out operation may be performed either at one of the regular stopping positions or stations, or at any point between those stations, as may be found most convenient or desirable.

A further object is to deliver the ware, after taking it out, to any desired delivery station or position, and to discharge it upon or deliver it to any suitable ware receiving table or conveyor which may be stationary, or may move at any desired speed and in any desired direction relative to the path of the take-out.

A further object is to so regulate and control the path of movement and speed of the take-out as to move it first into substantial coincidence with the path of the moving mold or carrier, and then move it in that path in substantial coincidence with the ware while approaching and passing the take-out position, and to subsequently stop or retard its movement as may be required or desired while delivering the ware, and then causing it to travel at a different speed if necessary to compensate for the time lost in such stopping or retardation.

Other objects of the invention will appear from the description to follow.

Apparatus illustrating an embodiment of the invention is shown in the drawings, in which—

Fig. 3 is a fragmentary plan, on an enlarged scale, of a modified embodiment of the invention;

Fig. 4 is a side elevation, partly in section, of the apparatus shown in Fig. 3;

Fig. 5 is a detail sectional elevation on line 5—5 of Fig. 3;

Figure 1:
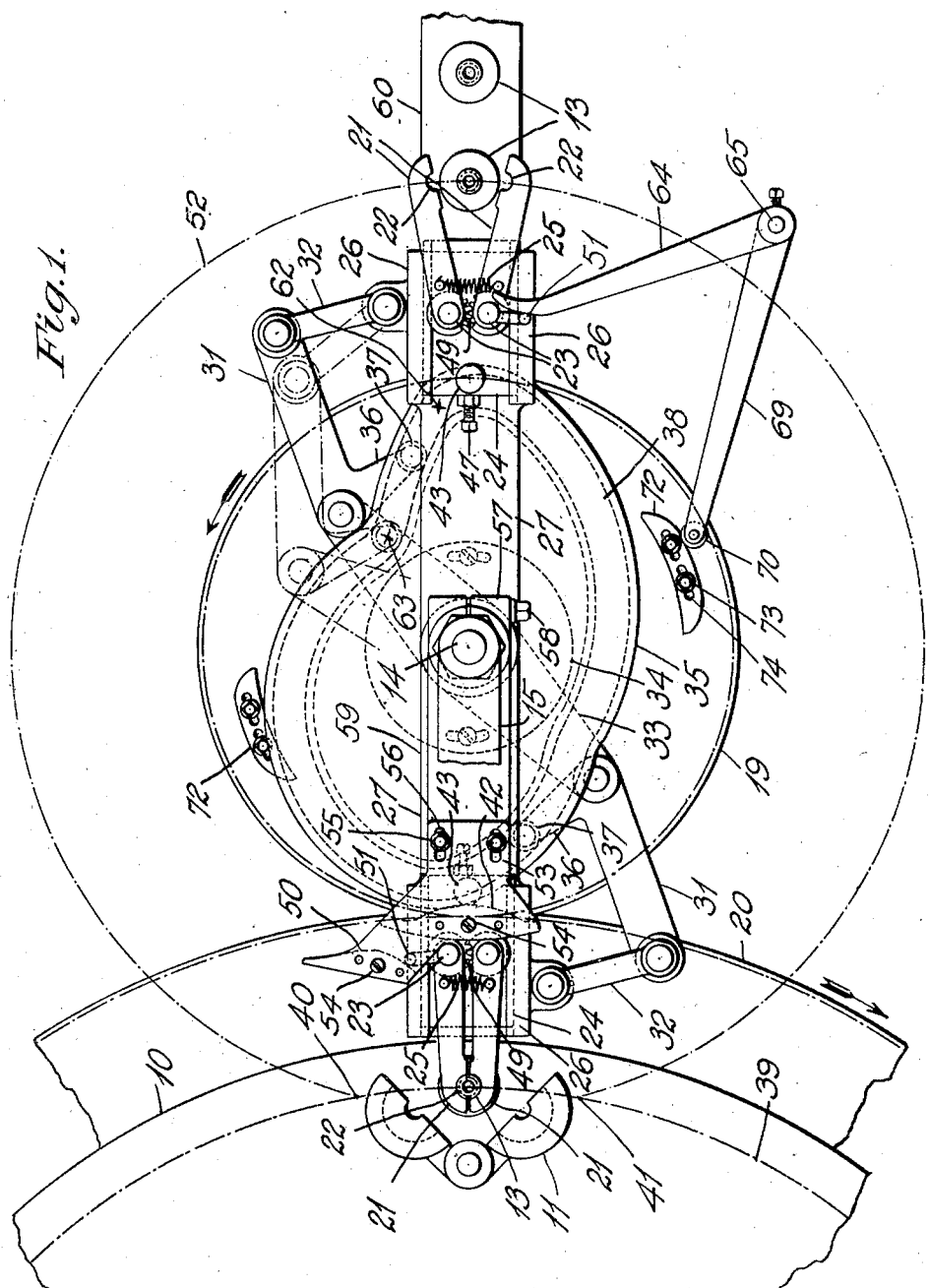
Figure 1 is a plan of the take-out mechanism together with portions of a shaping machine and a carrier for receiving the ware from the take-out.

Figs. 6—6$^a$ to 10—10$^a$ inclusive are diagrammatic views illustrating in plan and elevation the various positions of the two associated take-outs of the previous figures, and Fig. 11 is a diagrammatic plan showing delivery to a modified type of ware receiving apparatus and at a different period in the travel of the take-out.

In the present invention the construction is such that a relatively small and compact take-out device can be employed to serve a relatively large shaping machine or carrier, which may be many times larger than the take-out device. The reduction in the size of the take-out and the space occupied by it is made possible by moving it, or its ware engaging parts, substantially in coincidence with the ware while approaching and passing the take-out position. Approximately coincident movement of the mold and the take-out for an appreciable period, just previous to and during the engagement of the take-out with the ware, is important in order to avoid the extremely accurate timing and rapid action of the two mechanisms, which would be required where the take-out and the article are made to register only momentarily at the point of tangency of their paths. In the latter case, a relatively large take-out, moving in a large circle, would be required in order to have their paths of movement coincide closely enough, and for a period long enough, to enable the take-out operation to be performed without injury to this fragile ware, which at this period is usually not completely set. However large their circular paths of movement may be, and whether they are tangent to each other or overlap, the period or periods of coincidence are too short to permit of satisfactory operation. This is especially true, where as contemplated by the present invention the ware is engaged by the take-out as or before it is released by the molds or other holders. By moving the take-out in coincidence with the ware on approaching and passing the take-out position, as in this invention, it is possible to use a small take-out with a relatively large shaping machine, the saving of space being important.

This invention is illustrated in the drawings as adapted to the taking out of what is termed narrow neck ware, in which a head and neck left bare by the opening of the neck ring portion of the mold extend above the top of the body mold 11 upon approaching the take-out station. In taking out such ware the tongs, by traveling with and engaging the extending portion before the mold is opened, serve also to release the ware from the opening mold halves, breaking any adhesion occuring between the ware and the body mold, thus obviating the use of additional or special mechanism for holding the ware while opening the mold halves away from it. In the handling of pressed ware, which ordinarily is not thus exposed above the press mold, the ware is pushed up by the mold valve or bottom plate, so that its upper portion similarly projects above the press mold while approaching its take-out position. Thus, in commercial practice, the top or some portion of the ware usually extends above, or is pushed above the top of the mold, so that it can be taken out by the use of the present invention.

In the drawings a portion of a mold support or table 10 is shown, comprising a six mold machine having any desired type of molds 11. These are usually provided with bottom plates 12, upon which rest the bottles or other articles of ware 13. Any well-known means may be used for rotating the mold support at the desired rate.

Figure 2:
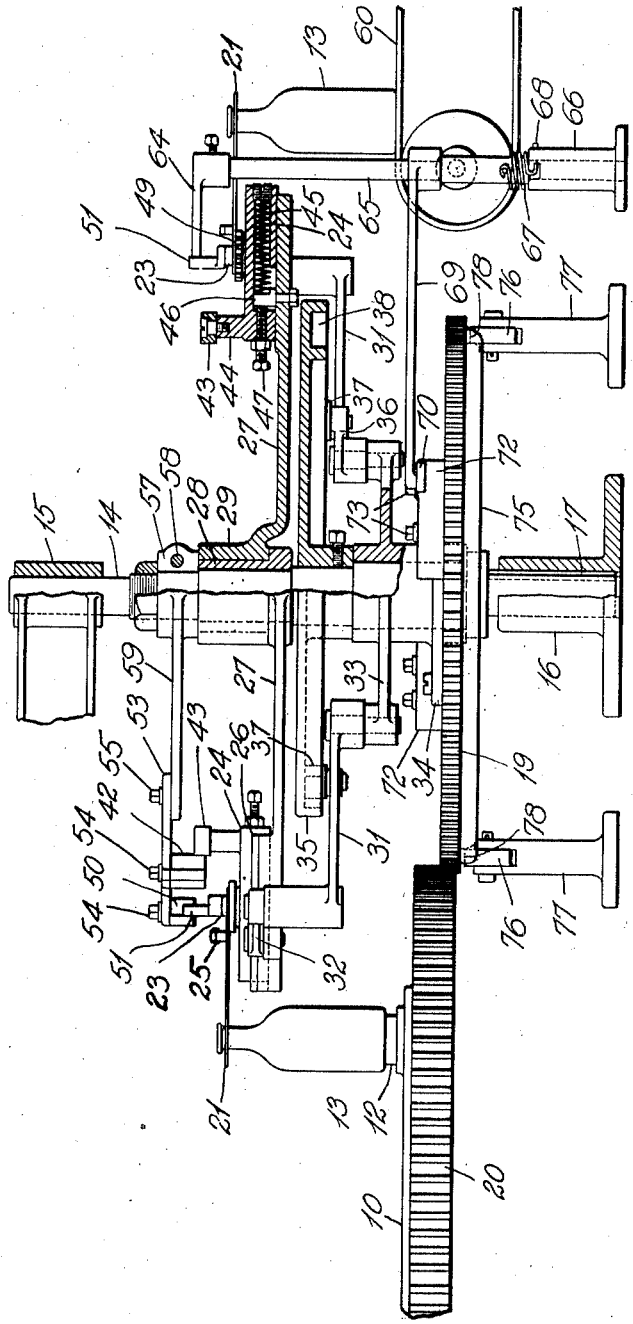
Fig. 2 is a side elevation partly in section, of the apparatus shown in Fig. 1.

The take-out mechanism is mounted on a shaft or standard 14 slidably mounted in the upper and lower bearings 15 and 16 respectively, the shaft being prevented from turning by a spline or key 17, preferably in the lower bearing 16, Fig. 2.

Rotatably mounted on the shaft 14 is a gear 19 for actuating the take-out devices. The teeth of the gear 19 mesh with those of a driving gear 20 suitably connected with the mold support 10 or other desired part of the shaping machine, or the take-out may be driven by an independent mechanism. In either case, the mechanisms will be so timed as to cause the successive molds and the take-outs to arrive at the take-out station A at the same time.

The take-out implements herein shown as tongs 21 are provided with properly shaped ware engaging portions 22, designed to suitably engage the particular type of ware to be made by the shaping machine. The tongs are pivoted at 23 on a slide 24 and closed by a spring 25, Fig. 1. The slides are each mounted between guides 26 on the outer ends of the take-out arms or supports 27, the left-hand arm being supported by a bearing 28 rotatably engaging the shaft 14 and the right-hand arm having a bearing 29 rotatably engaging the bearing 28, Fig. 2.

The take-out arms 27 are independently revolved relative to each other and are moved by the levers 31, connected with the outer ends of the arms by the links 32. The levers are pivotally supported upon a bracket 33 rotatably mounted upon the shaft 14, the bracket being adjustably secured to the gear 19 by suitable clamp screws extending through slots in the flanged portion 34 of the bracket.

Interposed between the take-out arms 27 and levers 31 is a stationary cam member 35, secured to the shaft 14 in any desired manner. The levers are provided with angular extensions 36 having upstanding rollers 37 projecting into the cam groove 38 of the cam member 35. While the speed of the gear 19 will be constant, the speed of each take-out arm 27 will vary during its revolution at the points and to the extent desired. Such variation is obtained by the proper shaping of the cam groove 38.

The coincident movement of the tongs with the ware and in the mold path may be for any desired time, as, for example, while the ware is moving between the points 40 and 41 (Fig. 1), or long enough to lower the opened tongs upon opposite sides of the ware, close them about the ware, and open the molds. The tongs are then preferably raised far enough to lift the ware off the bottom plate. Then the tongs will move the ware out from between the molds and out of coincidence with the mold path and be advanced along the take-out path 52 to deliver the ware to the take-out station B.

Radial movement of the slide 24 to maintain the tongs in concidence with the mold path the required length of time is controlled by a stationary cam 42, in conjunction with the revolving movement produced by the cam 38, the resultant of these movements being the concident movement of the tongs with the ware.

The cam 42 engages rollers 43 on studs 44 extending upwardly from the slides. Springs 45 located in recessed portions of the slides serve to hold the rollers 43 against the cam 42, one end of each spring engaging abutments on the slide and the other ends engaging stop bolts 46 secured to the slide holding arms 27. Regulation of the outward limit of movement of the slide is effected by a screw 47, threaded through the inner end of the slide into engagement with the stop bolt 46, (Fig. 2).

As the tongs approach coincident movement with the mold, it is necessary to open and thereafter maintain them in open position until they are ready to be closed in engagement with the ware after being lowered on opposite sides thereof. The opening of the tongs is effected by the operation of the intermeshing gear segments 49, suitably secured to the tongs, a cam 50 being provided to operate the crank arm 51 carried by one of the segments, at the time required to effect the opening. The cam 50 opens the tongs about the time they arrive over the ware and holds them open until the arms of the tongs are lowered on opposite sides of the neck or upper portion of the ware. The spring 25 then closes the tongs about the ware before the mold is opened. After the opening of the mold, the take-out, which continues to advance, is elevated by mechanism presently to be described, and the ware is thereby lifted from the bottom plate 12 before the tongs are moved out of coincidence with the mold path.

The slide operating cam 42 and the tongs opening cam 50 are each removably secured to the bracket 53 by the screws 54 so that cams of different sizes and shapes may be substituted therefor to effect the desired movements. The cam supporting bracket 53 is adjustably secured on an arm 59 by a bolt 55 extending through the slots 56 in the bracket and serving to clamp it upon the arm. In this way the slide operating cam 42 may be adjusted inwardly or outwardly to effect perfect registration of the tongs with the mold path. The arm 59 is provided with a split bearing portion 57 surrounding the shaft 14 and is adjustably held thereon by a clamp screw 58. By loosening the clamp screw the arm 54 may be rotated to effect adjustment of the slide operating cam 42 about the center of the shaft 14, whereby the tongs are made to close about the ware at the desired point.

The ware delivering or discharging station B may be located directly opposite the take-out station A, Fig. 1, or at any desired point in the take-out path 52, as at C in Fig. 11. The receiving apparatus may be a belt 60 or a revolvable or stationary table 61, or any other suitable type of receiver or conveyor, which may be actuated either intermittently or continuously and in timed relation to the take-out and may be arranged to move the ware away from the take-out path at any desired angle relative thereto.

When delivering the ware to a stationary receiver, or to a conveyor moving away substantially at right angles, as in the case of the belt 60 (Fig. 1), the take-out is brought substantially to rest over the belt before releasing the ware. The cam groove 38 when shaped as indicated between the points 62 and 63 will permit the right-hand lever 31 and link 32 to be moved by the continuously rotating bracket 33 to the dotted line position shown in Fig. 1, thus permitting the arm 27 to be retarded or to remain at rest at the delivery position B the desired length of time, long enough to effect the delivery of the ware to the conveyor 60. From the time the roller 37 reaches the point 63 of the cam groove, a rapid advancement of the take-out arm is produced so as to bring the tongs to the take-out station in time and at the speed desired to effect removal of the ware from the next succeeding mold, all of which is effected by the proper shaping of the cam path 38 and radial movement of the slide 24.

The opening of the tongs to release the ware at the delivery station B is effected by the movement of an arm 64 into engagement with the crank arm 51 of the tongs. The arm 64 is mounted on the upper end of a shaft 65, rotatable in a bearing 66 and is held in inoperative position by a spring 67 tending to move the shaft and the arm 64 clockwise. A pin 68 on the shaft 65 (Fig. 2) engages an abutment on the bearing 66 and serves to limit the clockwise movement of the arm 64. Movement of the arm 64 counter-clockwise, to the operating position shown in Fig. 1, is effected by a second arm 69 on the shaft 65 having a roller 70 in the path of an adjustable cam 72 on the gear 19, a separate cam being provided for each of the take-out arms. The cams are adjustable to the desired positions and are held by the clamp screws 73, extending through the slots 74 of the cams. The tongs opening mechanism just described may be so positioned as to effect their opening at any suitable point in the take-out path 52, at which it may be desired to discharge the ware.

The take-outs are each lowered twice in a single revolution, first at the take-out station A, to be closed about the ware, and later at the delivery station B, to deposit the ware upon the conveyor. The raising and lowering is effected by providing the under side of the gear 19 with a cam ring or circular track 75 resting upon the rollers 76 carried by the oppositely disposed brackets 77. The track is provided with like cam surfaces 78 disposed diametrically opposite each other, permitting the mechanism to be lowered when the take-outs are in the position shown in Figs. 1 and 2, and elevating it when leaving said position, whereby the ware is lifted by the tongs at station A, and the empty tongs raised at station B above the top of the ware just delivered. However, where the conveyor moves continuously, the ware may move out from between the tongs before they are raised.

During the raising and lowering of the take-out mechanism, the teeth of the gear 19 will slide upon the teeth of the gear 21 and the ends of the shaft 14 will slide in the upper and lower bearings 15 and 16 respectively.

In the modification shown in Figs. 3, 4 and 5, the elevating and lowering out of the entire take-out mechanism is avoided, means being provided for lifting only the take-out arms and the parts thereon. In these figures, the parts similar to those in Figs. 1 and 2 bear corresponding reference numerals. In this modification one take-out arm or support 80 is provided with a bearing portion 81, both rotatably and slidably mounted upon the central shaft 14, while the other take-out arm or support 82 is provided with a bearing portion 83 rotatable upon the bearing portion 81 of the arm 80. Thus the arms 80 and 82 will be raised and lowered together. The raising and lowering is effected by a cam ring 84 on the stationary cam member 85. The cam surfaces 86 (Fig. 5) of the ring 84 are located at diametrically opposite points and when the rollers 87 of the take-out arms are in the position shown in Fig. 5 the arms are in lowered position at the take-out and delivery stations, the take-outs being elevated when the rollers 87 move onto the high portions of the cam ring 84. The roller 87 is mounted upon a short shaft 88, the opposite ends of which are journaled in a bracket 89 suitably connected with the arm 80 and extending through an opening in the arm as shown in Fig. 4.

The cam member 85 is provided with a cam groove 90 so shaped as to effect the desired movements of the take-out arms 80 and 82, as described above in connection with Figs. 1 and 2.

The take-out actuating levers 91 are provided with angular extensions 92 carrying rollers 93 projecting into the cam groove 90 as shown in Figs. 3 and 4. The levers are pivotally supported upon the bracket 33, the flanged portion 34 of which is secured to the gear 19 as shown in Fig. 2. The lever 91 is provided with an upstanding pin 94 extending loosely through a block 95 slidably mounted in a rectangular guide frame 96 connected with the outer end of the take-out arms 80 and 82 at one side thereof as shown in Fig. 3. This construction affords a pivotal connection between the actuating levers 91 and the take-out arms and at the same time permits the arms to move up and down, since the blocks 95 are free to slide upon the pins 94. During the up and down movements of each take-out arm, its roller 43 and the crank arm 51 will ride freely on the fixed cams 42 and 50 for actuating the slide 24 and opening the tongs 21 respectively.

The successive operations of the take-out mechanism are diagrammatically indicated in Figs. 6 to 10 inclusive, which are a series of plan views, and in Figs. 6ª to 10ª which are series of corresponding elevations. In Figs. 6-6ª the left-hand tongs have reached the path of the ware at 40, opened in a plane above the ware, and begun to move in coincidence therewith, while the right-hand tongs have been brought to rest over the carrier 60, upon which its ware 13 is to be deposited. In Figs. 7-7ª both tongs have been lowered, the right-hand tongs to deposit its ware upon the conveyor and the moving left-hand tongs to ware engaging position. In Figs. 8-8ª the left-hand tongs have been closed about the ware, and the right-hand tongs have been opened to release the ware, at about the time the ware is deposited upon the conveyor. The next operation is to elevate both tongs simultaneously (Figs. 9-9ª), the left-hand tongs thereby raising the ware from the bottom plate 12 and the right-hand tongs being brought to the proper elevation to clear the top of the next succeeding article advanced by the mold table. The moving left-hand tongs may coincide with the mold path until they reach the point 41, Fig. 10, although it is not essential to continue the coincident movement to this point, as the ware may be withdrawn from the mold path as soon as it is safely held by the tongs, and can clear the mold 11. With the parts in the position shown in Figs. 10-10ª the right-hand tongs are ready for rapid advancement toward the take-out station, their speed being so regulated by the cam controlling their movement as to cause them to reach the point 40 simultaneously with the arrival at said point of the next succeeding article advancing in the mold path. During this time the left-hand take-out will be moving toward the delivery station B and will be brought to rest, or retarded as desired, over the conveyor to permit the ware to be delivered thereto as described above. The conveyor 60 may, if desired, be intermittently operated and may be at rest when the ware is deposited thereon, in which event the raising of the tongs (Fig. 9ª) will move them clear of the ware, leaving the latter free to be moved away.

The conveyor or receiving apparatus may be stationary or may rotate in either direction, or move in any desired direction relative to the take-out path. When rotating as shown by the arrow in Fig. 11, the tongs need not stop to deliver the ware at station C, as in this modification the tongs and the table 61 are preferably moved in unison at the time of delivery.

The present take-out apparatus is shown and described as adapted for taking out ware from a series of shaping molds moving in a circular path, the use to which it will most commonly be applied. Obviously it may be used for taking out or transferring ware from other types of moving ware holders or carriers. Also, the molds or ware holders may travel in other than circular paths, the controlling cams being adapted to impart the desired cooperating movements to the tongs or take-out members.

The take-out is herein referred to as moving in coincidence with the ware while approaching take-out position, although the tongs, until closed, are spaced slightly from the ware on the opposite sides of the neck or upper portion thereof. Nevertheless, they are centralized with respect to the ware at this time, and therefore may be said to move in coincidence therewith.

The tongs should be shaped and otherwise adapted to suit the shape or size or other characteristics of the ware to be handled. They may be made to clasp the ware, or merely embrace some portion of the ware without clasping or gripping it, all depending upon the various conditions met in practice.

In view of the many possible modifications of structure and mode of operation, it should be understood that no limitations are to be imposed on this invention except as indicated in the appended claims, and that the inventive matter herein disclosed is not restricted to the removal of bottles from molds having only one molding cavity.

I claim:

1. In glassware handling apparatus, the combination with a rotating ware holder, of a take-out device mounted to rotate about an axis spaced from that of said holder and adapted to move substantially in coincidence with the ware for a finite distance while approaching take-out position and arranged to engage and carry the ware from said holder.

2. In glassware handling apparatus, the combination with a rotating ware holder, of a take-out device mounted to rotate about an axis spaced from that of said holder, and means adapted to impart different movements to said device to move it in coincidence with the ware while approaching take-out position, said device being adapted to carry the ware from the holder.

3. In glassware handling apparatus, the combination with a rotating ware holder, of a take-out device mounted to rotate about an axis spaced from that of said holder, means to revolve the take-out and also move it radially of its axis of revolution, to maintain it in coincidence with the ware while approaching take-out position, and means adapted to effect its engagement with and removal of the ware while revolving.

4. In glassware handling apparatus, the combination with a rotating ware holder, of a take-out device mounted to rotate about an axis spaced from that of said holder and arranged to move substantially in coincidence with the ware for a finite distance while approaching take-out position, means adapted to effect engagement of the take-out with the ware during said coincident movement, and means to raise and lower the take-out while it is moving.

5. In glassware handling apparatus, the combination with a moving ware holder, of a take-out device arranged to move in coincidence with the ware while approaching take-out position, and to engage the ware during said coincident movement, means to move the take-out vertically while revolving, and means to vary the speed of the take-out movement.

6. In glassware handling apparatus, the combination with a rotating ware holder, of a take-out device mounted to rotate about an axis spaced from that of said holder and arranged to move in coincidence with the ware for a finite distance while approaching taking out position and to engage the ware during said coincident movement, means to move the take-out vertically at different points, and means to effect release of the ware at one of said points.

7. In glassware handling apparatus, the combination with a ware shaping mold mounted to rotate about a vertical axis and arranged to be opened and closed, of a take-out device mounted to rotate about an axis spaced from that of said mold and adapted to move in coincidence with the mold path for a finite distance while approaching its taking out position and to engage the ware before the mold is opened and carry it from the opened mold.

8. In glassware handling apparatus, the combination with a rotating ware shaping mold arranged to be opened and closed, of a take-out device mounted to rotate about an axis spaced from that of said mold and adapted to move in coincidence with the mold path for a finite distance while approaching its taking out position, and means to cause the take-out to hold the ware while the mold is being opened.

9. In glassware handling apparatus the combination with a rotating ware shaping mold arranged to be opened and closed, of a take-out device mounted to rotate about an axis spaced from that of said mold and adapted to move in coincidence with the mold for a finite distance while approaching its taking out position, means to cause the take-out to hold the ware while the mold is being opened, and means for raising the take-out to elevate and remove the ware from the mold.

10. In glassware handling apparatus, the combination with a moving ware holder, of a take-out device arranged to move substantially in coincidence with the ware while approaching its taking out position, and means for actuating the take-out device to impart retarding and accelerating movements thereto.

11. In glassware handling apparatus, the combination with a rotating ware holder, of a ware receiving apparatus, and a take-out device mounted to rotate about an axis spaced from that of said holder adapted to move substantially in coincidence with the ware for a finite distance while approaching its taking out position and to deliver the ware to said receiving apparatus.

12. In glassware handling apparatus, the combination with a moving ware shaping mold, of a ware receiving device, a take-out device for the ware, means for moving the take-out device substantially in coincidence with the moving ware while approaching its taking out position, and adapted to move it at a different speed when approaching said receiving device, and means for releasing the ware at said receiving device.

13. In glassware handling apparatus, the combination with a ware shaping mold mounted to rotate about a vertical axis, of a moving receiving device for the ware, and a take-out device mounted to rotate about an axis spaced from that of said mold and adapted to move in coincidence with the ware for a finite distance while approaching its taking out position and in timed relation with the receiving device at delivery position.

14. In glassware handling apparatus, the combination with a moving ware shaping mold, of a moving receiving device for the ware having a speed different from the mold speed, and a take-out device adapted for movement in timed relation with the mold while approaching its taking out position and with the receiving device at delivering position.

15. In glassware handling apparatus, the combination with a plurality of moving ware shaping molds mounted to rotate about a vertical axis, of a plurality of independent take-out devices mounted to rotate about an axis spaced from that of said molds and adapted to move in coincidence with the path of the molds for a finite distance while approaching taking out position, each being adapted to engage an article in said path during said coincident movement and to carry the articles from said path.

16. In glassware handling apparatus, the combination with a support mounted to rotate about a vertical axis and having a plurality of ware shaping molds, of a plurality of relatively movable take-out devices mounted separately from the support for rotation about an axis spaced from that of said support and each being adapted to periodically move in coincidence with the mold path while approaching its taking out position, and arranged to carry the ware from said path.

17. In glassware handling apparatus, the combination with a moving ware shaping mold mounted to rotate about a vertical axis, of a take-out device mounted to rotate about an axis spaced from that of said mold and to slide radially with respect to its axis of rotation, means for revolving and sliding said device, to maintain it in coincidence with the ware while approaching taking out position, and means for causing it to engage the ware during said coincident movement and to carry the ware from the mold.

18. In glassware handling apparatus, the combination with a ware holder mounted to rotate about a vertical axis, of tongs mounted to rotate about an axis spaced from that of said holder for taking the ware from the holder, means for moving the tongs substantially in coincidence with the ware for a finite distance while approaching taking out position, and means for operating the tongs while moving.

19. In glassware handling apparatus, the combination with a ware holder mounted to rotate about a vertical axis, of tongs mounted to rotate about an axis spaced from that of said holder for taking the ware from the holder, means for moving the tongs substantially in coincidence with the ware for a finite distance while approaching taking out position, and means for raising and lowering the tongs to effect vertical movement of the ware.

20. In glassware handling apparatus, the combination with a ware holder mounted to rotate about a vertical axis, of tongs mounted to rotate about an axis spaced from that of said holder for taking the ware from the holder, means for moving the tongs substantially in coincidence with the ware for a finite distance while approaching taking out position, means for opening and closing the tongs while moving, and means for raising and lowering the tongs at the take-out station.

21. In glassware handling apparatus, the combination with a moving ware holder, of a plurality of independently revoluble arms, each having a take-out device for carrying the ware from the holder, and means for revolving the arms, adapted to effect movement of one relative to another.

22. In glassware handling apparatus, the combination with a moving ware holder, of a plurality of independently revoluble arms, each having a take-out device adapted to carry the ware from the holder, and means for revolving the arms, said means being adapted to effect retardation and acceleration of said arms at predetermined points in their path of revolution.

23. In glassware handling apparatus, the combination with a moving ware holder, of a plurality of independently revoluble sets of take-out tongs adapted to move in coincidence with the ware while approaching taking out position, and means for revolving the tongs, adapted to effect movement of one set relative to another.

24. In glassware handling apparatus, the combination with a moving ware holder, of a plurality of independently revoluble sets of tongs adapted to move in coincidence with the ware while approaching taking out position, and means for revolving the tongs, said means being adapted to effect retardation and acceleration of the tongs at predetermined points in their path of revolution.

25. In glassware handling apparatus, the combination with a moving ware holder, of a plurality of independent sets of take-out tongs mounted for radial and revolving movements about an axis, means for revolving the tongs and moving them radially of their axis to maintain them in coincidence with the ware while approaching their taking out positions, and means for operating the tongs while moving.

26. In glassware handling apparatus, the combination with a ware holder mounted to rotate about a vertical axis, of a ware receiver, tongs mounted to rotate about an axis spaced from that of said holder for taking the ware from the holder to the receiver, means for maintaining the tongs substantially in coincidence with the ware for a finite distance while approaching taking out position, means for closing the tongs about the ware, means for elevating the tongs to raise the ware from the holder, means for lowering the tongs to deposit the ware upon the receiver, and means for opening the tongs to release the ware at the receiver.

27. In glassware handling apparatus, the combination with a ware holder mounted to rotate about a vertical axis, of an arm mounted to rotate about an axis spaced from that of said holder, a slide upon said arm, a take-out carried by the slide, cam mechanisms adapted to rotate the arm and effect movement of the slide to move said take-out in coincidence with the ware while approaching taking out position, and means for causing said take-out to engage the ware during said coincident movement.

28. In glassware handling apparatus, the combination with a moving ware holder, of a rotatable member, a slide upon said member, a take-out device carried by said slide, operating means for rotating said member, including a cam for regulating its speed, a cam adapted to move the slide upon said rotatable member, whereby the resultant of the rotating and sliding movements of the take-out causes it to travel in coincidence with the ware while approaching taking out position, and means for causing the take-out to remove the ware from the holder.

29. In glassware handling apparatus embodying a mold mounted to rotate about a vertical axis, a take-out device mounted to rotate about an axis spaced from that of said mold, and means for imparting different movements to the take-out to maintain it in coincidence with a portion of the path of the ware while approaching taking out position.

30. In glassware handling apparatus embodying a mold mounted to rotate about a vertical axis, a take-out device mounted to rotate about an axis spaced from that of said mold, said take-out being mounted for rotation about an axis, and means for rotating and moving said take-out radially of the axis, to maintain it in coincidence with a portion of the path of the ware while approaching taking out position.

31. In glassware handling apparatus embodying a mold mounted to rotate about a vertical axis, a take-out device mounted to rotate about an axis spaced from that of said mold, a rotatable support upon which the take-out is mounted for movement, means for rotating the support, and means for moving the take-out thereon, to maintain it in coincidence with a portion of the path of the ware for a finite distance while approaching taking out position.

32. In glassware handling apparatus, the combination with a moving ware shaping mold, of a fixed receiving station to receive the ware, and a take-out device adapted to move in coincidence with the ware for a finite distance while approaching its taking out position and to retard its motion at the fixed receiving station to permit delivery of the ware thereto.

33. The combination with a glass forming machine comprising a rotating mold carriage and molds thereon, of a receiving device spaced from the mold carriage, an apparatus for transferring articles from the molds of the forming machine to the receiving device, said apparatus comprising a carrier for receiving the articles from the molds, means for supporting said carrier for upward and downward movements, a drive member rotatable about a vertical axis and with which said supporting means is connected, driving mechanism extending from the mold carriage to said drive member for rotating the latter and causing the carrier to revolve about the axis of said drive member and thereby be brought periodically into said article receiving position, a cam controlling the upward and downward movements of said carrier, said cam being formed to permit a downward movement of the carrier when adjacent to the receiving device, whereby the articles may be deposited on the receiving device, an automatic means for causing said receiving device and said carrier to move in unison for a limited distance while the carrier is discharging to said receiving device.

34. The combination with a glass forming machine comprising a rotating mold carriage and molds thereon adapted to release articles during the rotation of the carriage, a conveyor, a means to transfer the articles to the conveyor, comprising a carrier, automatic means for actuating said carrier in synchronism with the movements of the mold carriage and thereby periodically bringing the carrier into register with the molds to receive the articles as they are released by the molds, and causing the carrier to travel in register with the molds while the articles are transferred from the molds to the carrier, the carrier being then moved to position to discharge the articles and deliver them to the conveyor.

35. The combination of a machine for forming glass articles comprising a mold carriage, molds thereon operable to release articles during the travel of the molds, transfer mechanism comprising a carrier, automatic means to move said carrier and cause it to travel in register with the molds during the release of said articles, and then to move away from the mold carriage, and mechanism to actuate said carrier to discharge the articles therefrom.

36. The combination of a machine for forming glass articles comprising a mold carriage, molds thereon operable to release articles during the travel of the molds, transfer mechanism comprising a carrier, automatic means to move said carrier and cause it to travel in register with the molds while receiving said articles and then move away from the mold carriage, mechanism to actuate said carrier to discharge the articles therefrom, said actuating mechanism including a cam, said carrier being moved downwardly while moving from an article receiving to a discharging position.

37. The combination of a machine for forming glass articles comprising a mold carriage, molds thereon operable to release articles during the travel of the molds, transfer mechanism comprising a carrier, an automatic means to move said carrier and cause it to travel in register with the molds for a substantial distance while receiving said articles, and then to move away from the mold carriage.

38. The combination of a machine for forming glass articles comprising a mold carriage, molds thereon operable to release articles during the travel of the molds, transfer mechanism comprising a carrier, automatic means to move said carrier and cause it to travel in register with the molds for a substantial distance while receiving said articles and then to move away from the mold carriage, mechanism to actuate said carrier to discharge the articles therefrom, said mechanism comprising a cam, and means to move the carrier vertically during the movements of the carrier between article receiving and discharging positions.

39. The combination of a glass forming machine comprising a rotating mold carriage and molds thereon, transfer mechanism comprising a drive member adapted to rotate about a vertical axis, a supporting member connected for rotation therewith, a carrier connected with said supporting member and moved thereby into position to register with the molds and to travel therewith to receive articles released from the traveling molds, and means for adjusting said supporting member rotatively about the axis of said drive member.

40. The combination of a glass forming machine comprising a rotating mold carriage and molds thereon, transfer mechanism comprising a rotatable drive member, a supporting member connected for rotation therewith, a carrier connected with said supporting member and moved thereby into position to receive articles released from the molds, means whereby said supporting member can be adjusted rotatively about the axis of said drive member, and means for actuating said carrier periodically to discharge articles therefrom.

41. The combination of a machine for forming glass articles, a carrier to receive the articles as they are released from the machine, driving mechanism extending from the machine to said carrier for causing the latter to travel and thereby carry the articles away from the machine, means to actuate said carrier for discharging the articles therefrom, a device for receiving the articles as they are discharged from the carrier, and means for causing said device to periodically move with the carrier while the articles are being discharged from the carrier.

42. The combination of a mold carriage, a rotary drive member, an article carrier having a driving connection with the drive member for causing it to travel about the axis of the drive member, a horizontally disposed power transmitting device forming a connection between the mold carriage and said drive member, means to actuate said carrier to discharge the articles therefrom, a receiving device to receive the articles as they are discharged from said carrier, a cam on said power transmitting member, and means associated with said cam for causing downward movement of the carrier to a discharging position when said carrier is adjacent to said receiving device.

Signed at Washington, D. C. this 3rd day of March, 1923.

KARL E. PEILER.